US008843888B2

(12) United States Patent
Darcy et al.

(10) Patent No.: US 8,843,888 B2
(45) Date of Patent: Sep. 23, 2014

(54) CHARACTERIZING ARTIFICIALITY IN OBJECT CODE

(75) Inventors: Joseph D. Darcy, Mountain View, CA (US); Alexander R. Buckley, Cupertino, CA (US)

(73) Assignee: Oracle America, Inc., Redwood Shores, CA (US)

( * ) Notice: Subject to any disclaimer, the term of this patent is extended or adjusted under 35 U.S.C. 154(b) by 709 days.

(21) Appl. No.: 12/694,139

(22) Filed: Jan. 26, 2010

(65) Prior Publication Data

US 2011/0185344 A1 Jul. 28, 2011

(51) Int. Cl.
*G06F 9/44* (2006.01)
*G06F 15/00* (2006.01)
*G06F 9/45* (2006.01)

(52) U.S. Cl.
CPC ... *G06F 8/43* (2013.01); *G06F 8/53* (2013.01)
USPC ........... 717/116; 717/110; 717/111; 717/131; 714/38.1

(58) Field of Classification Search
None
See application file for complete search history.

(56) References Cited

U.S. PATENT DOCUMENTS

| 5,371,747 | A  | * | 12/1994 | Brooks et al. | 714/38.1 |
|---|---|---|---|---|---|
| 6,233,729 | B1 | * | 5/2001  | Campara et al. | 717/131 |
| 6,275,983 | B1 | * | 8/2001  | Orton et al. | 717/116 |
| 6,292,937 | B1 | * | 9/2001  | Sakata et al. | 717/116 |
| 7,500,222 | B2 | * | 3/2009  | Bates et al. | 717/111 |
| 7,627,861 | B2 | * | 12/2009 | Smith et al. | 717/144 |
| 8,347,266 | B2 | * | 1/2013  | Meijer et al. | 717/116 |
| 8,499,280 | B2 | * | 7/2013  | Davies et al. | 717/110 |
| 2004/0153994 | A1 | * | 8/2004  | Bates et al. | 717/110 |
| 2004/0216085 | A1 | * | 10/2004 | Wilson et al. | 717/108 |
| 2005/0166193 | A1 | * | 7/2005  | Smith et al. | 717/143 |
| 2011/0185344 | A1 | * | 7/2011  | Darcy et al. | 717/116 |
| 2011/0321009 | A1 | * | 12/2011 | Shulmister, Jr. | 717/116 |

OTHER PUBLICATIONS

James Gosling et al., "The Java™ Language Specification" [Online], The Third Edition May 2005, pp. 1-684, [Rrtrieved from Internet on May 1, 2012], <http://docs.oracle.com/javase/specs/jls/se5.0/jls3.pdf>.*

P.D. Scott et al., "Evaluating data mining procedures: techniques for generating artificial data sets", [Online], 1999, pp. 579-587, [Retrieved from Interent on May 9, 2014], <http://ac.els-cdn.com/S095058499900021X/1-s2.0-S095058499900021X-main.pdf>.*

(Continued)

*Primary Examiner* — Thuy Dao
*Assistant Examiner* — Ziaul A Chowdhury
(74) *Attorney, Agent, or Firm* — Park, Vaughan, Fleming & Dowler LLP

(57) ABSTRACT

One embodiment of the present invention provides a system that characterizes content in object code. During operation, the system receives the source code of a program. The system also receives one or more pieces of object code of the program, or creates one or more pieces of object code from the source code. Next, the system identifies a construct in the object code. The system then determines whether the construct is physically present in the source code. If the construct is not physically present, the system determines whether the construct is logically present in the source code, wherein a construct is logically present if it is required by the programming language. If so, the system sets a construct flag to indicate that the construct is "synthesized." However, if not, the system sets the construct flag to indicate that the construct is "synthetic." Finally, the construct flag is made available to a reflective API.

18 Claims, 3 Drawing Sheets

(56) References Cited

OTHER PUBLICATIONS

Nikola Milanovic et al., "Extracting Functional and Non-functional Contracts from Java Classes and Enterprise Java Beans", [Online], 2003, pp. 1-16, [Retrieved from Internet on May 9, 2014], <http://www2.informatik.hu-berlin.de/~milanovi/extracting-contracts.pdf>.*

Michael D. Ernst et al, "Dynamically Discovering Likely Program Invariants to Support Program Evolution", [Online], 2001,pp. 99-123, [Retrieved from Internet on May 9, 2014], <http://ieeexplore.ieee.org/stamp/stamp.jsp?tp=&arnumber=908957>.*

Boukari Souley et al., "A Class Coupling Analyzer for Java Programs", [Online], 2013, pp. 3-13, [Retrived from Internet on May 9, 2014], <http://www.ajol.info/index.php/wajiar/article/viewFile/91389/80885>.*

* cited by examiner

CHARACTERIZING ARTIFICIALITY IN OBJECT CODE

BACKGROUND

1. Field of the Invention

The present invention relates to computer programming. More specifically, the present invention relates to a method and an apparatus for characterizing artificiality in object code. The object code may have been produced by transforming a source language into object code via a compiler.

2. Related Art

Computer programs are typically written in source code and then compiled into object code for execution on a specific platform or by a specific virtual machine. During the transformation from source code to object code, some constructs from the source code are preserved in the resultant object code, while other constructs may not be preserved. Furthermore, the resultant object code typically incorporates constructs that were not present in the original source code, such as implementation details specifying how the compiler implements the semantics of the programming language.

In many instances, programmers find themselves in the situation where they have a collection of object code, and they want to ask questions about the object code in terms of source code semantics. In these instances, programmers often use reflective tools to analyze the object code to create corresponding source code, or to answer their questions about the object code in terms of source code semantics, if the source code is unavailable. Various techniques have been developed to help the programmer distinguish between constructs in the object code that correspond to constructs in the source code and constructs in the object code that associated with a specific compiler implementation.

For example, the ClassFile format used by the JAVA Virtual Machine is able to flag classes, fields, and methods as "synthetic." (Note that the terms JAVA, JVM and JAVA VIRTUAL MACHINE are trademarks of SUN Microsystems, Inc. of Santa Clara, Calif.) The synthetic flag indicates that the class/field/method was generated implicitly by a compiler and does not appear in source code. This flag is typically used to mark ClassFile content that is an implementation detail of how the compiler implements the semantics of a programming language such as JAVA. As such, in most cases, a synthetic artifact should not be relied on by JAVA Virtual Machine implementations, nor exposed by Application Programming Interfaces (APIs,) nor manipulated by tools. Please note that in some instances, certain synthetic artifacts can be relied upon to be created in a particular way.

Separately, the semantics of a programming language sometimes mandate that artifacts be automatically provided if not written explicitly by the programmer. For example, in the JAVA programming language, a class has a default no-args constructor if the programmer does not supply any constructor, and an enum type has certain methods which are part of the type's public API but which cannot (for safety reasons) by written by a programmer. It is useful for a number of reasons to mark such artifacts in the ClassFile as implicitly generated. However, this cannot be accomplished with the "synthetic" flag because the artifacts are not implementation details and should not be hidden in reflective APIs presenting a source-level view.

SUMMARY

One embodiment of the present invention provides a system for characterizing content in object code. During operation, the system receives the source code of a program. Note that this can include receiving multiple pieces of source code, as well as paths to other source material. The system also receives one or more pieces of object code of the program, or creates one or more collections of object code from the source code. Next, the system identifies a construct in the object code. The system then determines whether the construct is physically present in the source code. If the construct is not physically present, the system determines whether the construct is logically present in the source code, wherein a construct is logically present if it is required by the programming language. If so, the system sets a construct flag to indicate that the construct is "synthesized." However, if not, the system sets the construct flag to indicate that the construct is "synthetic." Finally, the construct flag is available to a reflective API.

In some embodiments of the present invention, the construct can include any artifact in the object code that has a relationship to the programming language of the source code.

In some embodiments of the present invention, the construct can include at least one of: a piece of object code; a method, including constructors and static initializers; a method parameter; a field; a local variable; or an annotation.

In some embodiments of the present invention, the system identifies a method in the object code. Next, the system identifies a parameter of the method. The system then determines whether the parameter is physically present in the source code. If the parameter is not physically present, the system determines whether the parameter is logically present in the source code. If so, the system sets a parameter flag to indicate that the parameter is "synthesized". However, if not, the system sets the parameter flag to indicate that the parameter is "synthetic".

In some embodiments of the present invention, the system sets the parameter flag to indicate that the parameter is "natural" if the parameter is physically present and logically present in the source code. Furthermore, in some embodiments, the system sets the parameter flag to indicate that the parameter is "commentary" if the parameter is physically present but not logically present in the source code.

In some embodiments of the present invention, the system identifies a further parameter of the method, wherein the further parameter is logically present at runtime, but is neither physically present in the source code nor present in the object code. The system then sets a second parameter flag to indicate that the further parameter is "implicit."

In some embodiments of the present invention, the system sets the construct flag to indicate that the construct is "natural" if the construct is physically present and logically present in the source code. Furthermore, in some embodiments, the system sets the construct flag to indicate that the construct is "commentary" if the construct is physically present but not logically present in the source code.

In some embodiments of the present invention, constructs flagged as "synthetic" are suppressed by the reflective API.

In some embodiments of the present invention, constructs flagged as "synthesized" are revealed by the reflective API.

In some embodiments of the present invention, the construct flag is saved in the object code.

In some embodiments of the present invention, the program is a compiler. Note that in these embodiments, the program receives the one or more pieces of object code by creating the one or more pieces of object code from the source code.

Figure 1:
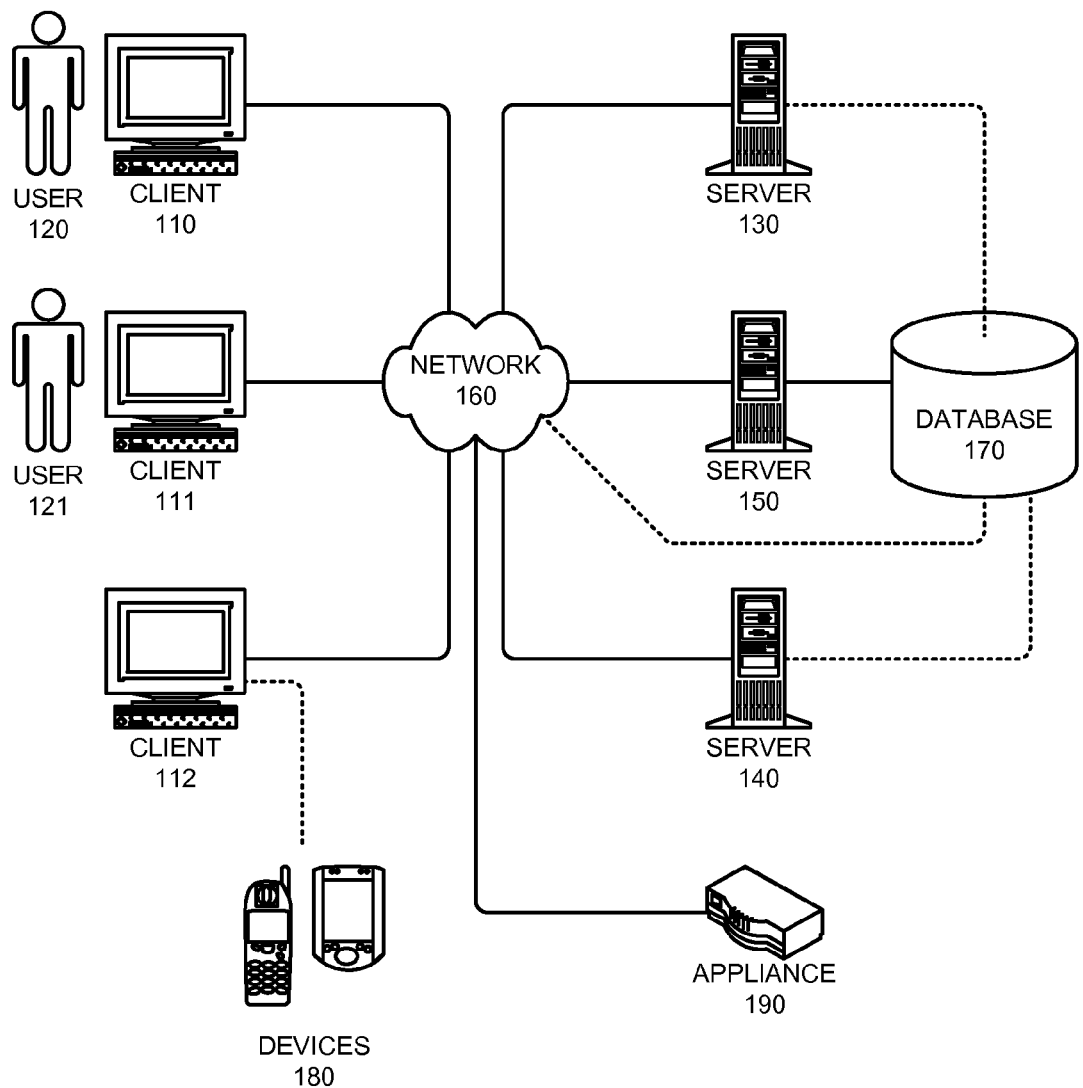
FIG. 1 illustrates a computing environment in accordance with an embodiment of the present invention.

TABLE 1 presents the conditions associated with flags for constructs in the object code in accordance with an embodiment of the present invention.

TABLE 2 presents JAVA source code "C.java" in accordance with an embodiment of the present invention.

TABLE 3 presents JAVA object code "ClassFile C" in accordance with an embodiment of the present invention.

TABLE 4 presents JAVA object code "ClassFile C$D" in accordance with an embodiment of the present invention.

TABLE 5 presents JAVA object code "ClassFile C$1" in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Overview

Embodiments of the present invention introduce a "synthesized" flag that allows a compiler to flag a class, field, or method in a ClassFile as implicitly generated because it is logically present in source code but not physically present in source code. Because the flagged artifact is logically present in source code, it is not an implementation detail of the compiler. The existing "synthetic" flag then indicates true implementation details by adopting the meaning that it flags a class, field, or method that is not logically present in source code and not physically present in source code.

TABLE 1

| CONDITIONS FOR CONSTRUCTS FLAGGED IN OBJECT CODE | | |
|---|---|---|
| | PHYSICALLY PRESENT IN SOURCE | LOGICALLY PRESENT IN SOURCE |
| NATURAL | YES | YES |
| COMMENTARY | YES | NO |
| SYNTHESIZED | NO | YES |
| SYNTHETIC | NO | NO |

TABLE 1 presents the conditions associated with flags for constructs in the object code in accordance with an embodiment of the present invention. If a construct in the object code is flagged as "natural," the construct is both physically and logically present in the source code. As described previously, if a construct in the object code is flagged as "synthetic," the construct is neither physically present nor logically present in the source code, such as a compiler implementation detail.

One major advantage provided by embodiments of the present invention is to indicate when constructs in the object code are not physically present in the source code, but are indeed logically present in the source code. These constructs are flagged as "synthesized," and may include constructs that are mandated by the programming language and are implicitly generated by the compiler.

Note that while some constructs may be physically but not logically present in the source code, such as programmer comments, they typically will not be found in the object code. However, if they are preserved in the object code during compilation, embodiments of the present invention can flag these constructs as well to indicate their original status in the source code.

While the description herein describes a compiler flagging the constructs during compilation, embodiments of the present invention are not meant to be limited to the flagging of constructs by a compiler during compilation. In some embodiments, the flagging may be applied by a separate program or mechanism. Furthermore, it is possible for a programmer to create object code manually in a hex editor and to manually flag constructs. Less importance should be placed on how a construct is flagged, and the focus should remain on the meaning of the flag for a construct.

One embodiment of the present invention provides a system for characterizing content in object code. During operation, the system receives the programming language source code of a program. The system also receives one or more pieces of object code comprising the program, or creates one or more pieces of object code from the source code. Next, the system identifies a construct in the object code. The system then determines whether the construct is physically present in the source code. If the construct is not physically present, the system determines whether the construct is logically present in the source code, wherein a construct is logically present if it is required by the programming language. If so, the system sets a construct flag to indicate that the construct is "synthesized." However, if not, the system sets the construct flag to indicate that the construct is "synthetic". Finally, the construct flag is available to a reflective API.

Note that object code may refer to machine code that is executed directly, or bytecode that is interpreted via an interpreter or virtual machine. In some embodiments of the present invention, object code refers to any code other than the source code in the original programming language. For example, in some embodiments, the object code is a ClassFile or other suitable executable output capable of running on the JAVA Programming Language.

In some embodiments of the present invention, the construct can include any artifact in the object code that has a relationship to the programming language of the source code. For example, the construct can include at least one of: a piece of object code; a method, including constructors and static initializers; a method parameter; a field; a local variable; or an annotation. Note that this is not intended to be an exhaustive list of what a construct can include, and is included for exemplary purposes only.

In some embodiments of the present invention, the system identifies a method in the object code. Next, the system identifies a parameter of the method. The system then determines whether the parameter is physically present in the source code. If the parameter is not physically present, the system determines whether the parameter is logically present in the source code. If so, the system sets a parameter flag to indicate that the parameter is "synthesized". However, if not, the system sets the parameter flag to indicate that the parameter is "synthetic". Examples of flagging parameters are provided in more detail with regard to the description of tables 2-5 below.

In some embodiments of the present invention, the system sets the parameter flag to indicate that the parameter is "natural" if the parameter is physically present in the source code. Furthermore, in some embodiments, the system sets the construct flag to indicate that the construct is "natural" if the construct is physically present in the source code.

In some embodiments of the present invention, the system identifies a further parameter of the method, wherein the further parameter is logically present at runtime, but is not physically present in the source code and not physically present in the object code. The system then sets a second parameter flag to indicate that the further parameter is "implicit". For example, at runtime, every method includes a "zero-th parameter" that refers back to itself. This zero-th parameter is not physically present in either the source or the object code, but is logically present at runtime.

In some embodiments of the present invention, constructs flagged as "synthetic" are suppressed by the reflective API while constructs flagged as "synthesized" are revealed by the reflective API. Note that in some embodiments, the construct flag is saved in the object code. This can be accomplished at compile time by the compiler or another program, but it could also occur sometime after compile time.

JAVA Example

TABLE 2 presents JAVA source code "C.java" in accordance with an embodiment of the present invention. C.java includes public class C as well as private class D.

TABLE 2

JAVA SOURCE CODE "C.Java"

```
public class C {
    // Implicit constructor for C
    private int i;
    private class D {
        // Implicit constructor for D
        void foo( ) {
            i = i+1;
        }
    }
    public static void main(String... args) {
        C c = new C( ); // call implicit constructor
        c.i = 5;
        System.out.println("c.i = " + c.i);
        D d = c.new D( );
        d.foo( );
        System.out.println("c.i = " + c.i);
    }
}
```

In one embodiment of the present invention, compiling C.java results in the following three files containing object code: ClassFile C (TABLE 3), ClassFile C$D (TABLE 4), and ClassFile C$1 (TABLE 5).

Source class C from C.java compiles to ClassFile C. Note that ClassFile C is NATURAL because it is physically present in both the source code and object code. Furthermore, the compiler has added a "no-args" constructor to ClassFile C which is flagged as SYNTHESIZED because it is not physically present in the source code, but it is logically present in the source code.

Source class C.D from C.java compiles to ClassFile C$D. Note that ClassFile C$D is SYNTHESIZED because it is the executable embodiment of a source type C.D contained within the source for class C. There is no independent source file for type C.D. ClassFile C$D is not physically present in the source code C.java, but the type C.D is logically present in C.java.

TABLE 3

JAVA OBJECT CODE "ClassFile C"

```
$ javap -verbose C
  Classfile C.class
  Last modified Jan 14, 2010; size 1003 bytes
        MD5 checksum 1512fb0ab62750a5328603574ef48258
        Compiled from "C.Java"
    public class C extends java.lang.Object
        SourceFile: "C.Java"
        InnerClasses:
             static #18 of #3; //class C$1 of class C
        minor version: 0
        major version: 51
        flags: ACC_PUBLIC, ACC_SUPER
     Constant pool:
        #1 = Fieldref       #3.#36       // C.i:I
        #2 = Methodref      #17.#37      // java/lang/Object."<init>":( )V
        #3 = Class          #38          // C
        #4 = Methodref      #3.#37       // C."<init>":( )V
        #5 = Fieldref       #39.#40      // java/lang/System.out:Ljava/io/PrintStream;
```

TABLE 3-continued

JAVA OBJECT CODE "ClassFile C"

```
        #6 = Class              #41           // java/lang/StringBuilder
        #7 = Methodref          #6.#37        // java/lang/StringBuilder."<init>":( )V
        #8 = String             #42           // c.i =
        #9 = Methodref          #6.#43        //
java/lang/StringBuilder.append:(Ljava/lang/String;)Ljava/lang/StringBuilder;
       #10 = Methodref          #6.#44        //
java/lang/StringBuilder.append:(I)Ljava/lang/StringBuilder;
       #11 = Methodref          #6.#45        //
java/lang/StringBuilder.toString:( )Ljava/lang/String;
       #12 = Methodref          #46.#47       //
java/io/PrintStream.println:(Ljava/lang/String;)V
       #13 = Class              #48           // C$D
       #14 = Methodref          #17.#49       // java/lang/Object.getClass:( )Ljava/lang/Class;
       #15 = Methodref          #13.#50       // C$D."<init>":(LC;LC$1;)V
       #16 = Methodref          #13.#51       // C$D.foo:( )V
       #17 = Class              #52           // java/lang/Object
       #18 = Class              #53           // C$1
       #19 = Utf8               #20 = Utf8                InnerClasses
       #21 = Utf8               D
       #22 = Utf8               i
       #23 = Utf8               I
       #24 = Utf8               <init>
       #25 = Utf8               ( )V
       #26 = Utf8               Code
       #27 = Utf8               LineNumberTable
       #28 = Utf8               main
       #29 = Utf8               ([Ljava/lang/String;)V
       #30 = Utf8               access$002
       #31 = Utf8               (LC;I)I
       #32 = Utf8               access$000
       #33 = Utf8               (LC;)I
       #34 = Utf8               SourceFile
       #35 = Utf8               C.Java
       #36 = NameAndType        #22:#23       // i:I
       #37 = NameAndType        #24:#25       // "<init>":( )V
       #38 = Utf8               C
       #39 = Class              #54           // java/lang/System
       #40 = NameAndType        #55:#56       // out:Ljava/io/PrintStream;
       #41 = Utf8               java/lang/StringBuilder
       #42 = Utf8               c.i =
       #43 = NameAndType        #57:#58       //
append:(Ljava/lang/String;)Ljava/lang/StringBuilder;
       #44 = NameAndType        #57:#59       // append:(I)Ljava/lang/StringBuilder;
       #45 = NameAndType        #60:#61       // toString:( )Ljava/lang/String;
       #46 = Class               #62          // java/io/PrintStream
       #47 = NameAndType        #63:#64       // println:(Ljava/lang/String;)V
       #48 = Utf8               C$D
       #49 = NameAndType        #65:#66       // getClass:( )Ljava/lang/Class;
       #50 = NameAndType        #24:#67       // "<init>":(LC;LC$1;)V
       #51 = NameAndType        #68:#25       // foo:( )V
       #52 = Utf8               java/lang/Object
       #53 = Utf8               C$1
       #54 = Utf8               java/lang/System
       #55 = Utf8               out
       #56 = Utf8               Ljava/io/PrintStream;
       #57 = Utf8               append
       #58 = Utf8               (Ljava/lang/String;)Ljava/lang/StringBuilder;
       #59 = Utf8               (I)Ljava/lang/StringBuilder;
       #60 = Utf8               toString
       #61 = Utf8               ( )Ljava/lang/String;
       #62 = Utf8               java/io/PrintStream
       #63 = Utf8               println
       #64 = Utf8               (Ljava/lang/String;)V
       #65 = Utf8               getClass
       #66 = Utf8               ( )Ljava/lang/Class;
       #67 = Utf8               (LC;LC$1;)V
       #68 = Utf8               foo
{
    public C( );
       flags: ACC_PUBLIC, ACC_SYNTHESIZED
       Code:
          stack=1, locals=1, args_size=1
            0: aload_0            1: invokespecial #2         // Method
java/lang/Object."<init>":( )V
            4: return             LineNumberTable:
              line 1: 0
              line 5: 4
    public static void main(java.lang.String...);
```

TABLE 3-continued

| JAVA OBJECT CODE "ClassFile C" |
|---|

```
        flags: ACC_PUBLIC, ACC_STATIC, ACC_VARARGS
        Code:
            stack=4, locals=3, args_size=1
                0: new           #3             // class C
                3: dup           4: invokespecial  #4       // Method "<init>":( )V
                7: astore_1      8: aload_1        9: iconst_5   10:
putfield  #1                     // Field i:I
                13: getstatic    #5             // Field
java/lang/System.out:Ljava/io/PrintStream;
                16: new          #6             // class java/lang/StringBuilder
                19: dup          20: invokespecial  #7       // Method
java/lang/StringBuilder."<init>":( )V
                23: ldc          #8             // String c.i =
                25: invokevirtual  #9           // Method
java/lang/StringBuilder.append:(Ljava/lang/String;)Ljava/lang/StringBuilder;
                28: aload_1      29: getfield   #1         // Field i:I
                32: invokevirtual  #10          // Method
java/lang/StringBuilder.append:(I)Ljava/lang/StringBuilder;
                35: invokevirtual  #11          // Method
java/lang/StringBuilder.toString:( )Ljava/lang/String;
                38: invokevirtual  #12          // Method
java/io/PrintStream.println:(Ljava/lang/String;)V
                41: new          #13            // class C$D
                44: dup          45: aload_1    46: dup      47:
invokevirtual #14                // Method java/lang/Object.getClass:( )Ljava/lang/Class;
                50: pop          51: aconst_null    52: invokespecial
#15      // Method C$D."<init>":(LC;LC$1;)V
                55: astore_2     56: aload_2    57: invokevirtual
#16      // Method C$D.foo:( )V
                60: getstatic    #5             // Field
java/lang/System.out:Ljava/io/PrintStream;
                63: new          #6             // class java/lang/StringBuilder
                66: dup          67: invokespecial  #7       // Method
java/lang/StringBuilder."<init>":( )V
                70: ldc          #8             // String c.i =
                72: invokevirtual  #9           // Method
java/lang/StringBuilder.append:(Ljava/lang/String;)Ljava/lang/StringBuilder;
                75: aload_1      76: getfield   #1         // Field i:I
                79: invokevirtual  #10          // Method
java/lang/StringBuilder.append:(I)Ljava/lang/StringBuilder;
                82: invokevirtual  #11          // Method
java/lang/StringBuilder.toString:( )Ljava/lang/String;
                85: invokevirtual  #12          // Method
java/io/PrintStream.println:(Ljava/lang/String;)V
                88: return       LineNumberTable:
                line 12: 0
                line 13: 8
                line 15: 13
                line 16: 41
                line 17: 56
                line 18: 60
                line 19: 88
    static int access$002(C, int);
        flags: ACC_STATIC, ACC_SYNTHETIC
        Code:
            stack=3, locals=2, args_size=2
                0: aload_0       1: iload_1    2: dup_x1    3:
putfield  #1                     // Field i:I
                6: ireturn       LineNumberTable:
                line 1: 0
    static int access$000(C);
        flags: ACC_STATIC, ACC_SYNTHETIC
        Code:
            stack=1, locals=1, args_size=1
                0: aload_0       1: getfield   #1         // Field i:I
                4: ireturn       LineNumberTable:
                line 1: 0
}
```

In source class C, "c.new D( )" compiles to:

```
new #13; //class C$D
...
invokespecial #15; //Method C$D."<init>":(LC;LC$1;)V
```

For example, the C$D class is instantiated, then its constructor (technically a method "<init>" with two arguments) is called. The first argument passed to the constructor is a reference to the C object in variable c.

C$D's <init> method is marked SYNTHESIZED because the JAVA language says source class C.D has a default no-args constructor. Furthermore, both parameters of <init> should be marked SYNTHETIC because they are about connecting a C$D object to a C object. These parameters are implementation details of the compiler and are not logically present in C.java.

TABLE 4

JAVA OBJECT CODE "ClassFile C$D"

```
$ javap -verbose C.D
Classfile C$D.class
    Last modified Jan 14, 2010; size 486 bytes
    MD5 checksum 78233807b25b832ff89d570877eccad9
    Compiled from "C.Java"
class C$D extends java.lang.Object
    SourceFile: "C.Java"
    InnerClasses:
        static #16 of #25; //class C$1 of class C
    minor version: 0
    major version: 51
    flags: ACC_SUPER, ACC_SYNTHESIZED
Constant pool:
    #1  = Methodref    #6.#22        // C$D."<init>":(LC;)V
    #2  = Fieldref     #6.#23        // C$D.this$0:LC;
    #3  = Methodref    #7.#24        // java/lang/Object."<init>":( )V
    #4  = Methodref    #25.#26       // C.access$000:(LC;)I
    #5  = Methodref    #25.#27       // C.access$002:(LC;I)I
    #6  = Class        #28           // C$D
    #7  = Class        #30           // java/lang/Object
    #8  = Utf8         this$0
    #9  = Utf8         LC;
    #10 = Utf8         <init>
    #11 = Utf8         (LC;)V
    #12 = Utf8         Code
    #13 = Utf8         LineNumberTable
    #14 = Utf8         foo
    #15 = Utf8         ( )V
    #16 = Class        #31           // C$1
    #17 = Utf8         #18 = Utf8              InnerClasses
    #19 = Utf8         (LC;LC$1;)V
    #20 = Utf8         SourceFile
    #21 = Utf8         C.java
    #22 = NameAndType  #10:#11       // "<init>":(LC;)V
    #23 = NameAndType  #8:#9         // this$0:LC;
    #24 = NameAndType  #10:#15       // "<init>":( )V
    #25 = Class        #32           // C
    #26 = NameAndType  #33:#34       // access$000:(LC;)I
    #27 = NameAndType  #35:#36       // access$002:(LC;I)I
    #28 = Utf8         C$D
    #29 = Utf8         D
    #30 = Utf8         java/lang/Object
    #31 = Utf8         C$1
    #32 = Utf8         C
    #33 = Utf8         access$000
    #34 = Utf8         (LC;)I
    #35 = Utf8         access$002
    #36 = Utf8         (LC;I)I
{
  final C this$0;
    flags: ACC_FINAL, ACC_SYNTHETIC
  void foo( );
    flags:
    Code:
        stack=3, locals=1, args_size=1
            0: aload_0     1: getfield    #2        // Field this$0:LC;
            4: aload_0     5: getfield    #2        // Field this$0:LC;
            8: invokestatic #4                      // Method C.access$000:(LC;)I
            11: iconst_1   12: iadd                 13: invokestatic #5   // Method C.access$002:(LC;I)I
            16: pop        17: return               LineNumberTable:
            line 8: 0
            line 9: 17
  C$D(C, C$1);
```

TABLE 4-continued

JAVA OBJECT CODE "ClassFile C$D"

```
        flags: ACC_SYNTHESIZED
        Code:
            stack=2, locals=3, args_size=3
                0: aload_0      1: aload_1          2: invokespecial
#1              // Method "<init>":(LC;)V
                5: return       LineNumberTable:
                line 5: 0
}
```

ClassFile C$D has a field "this$0." C$D's constructor sets this$0 to the parameter containing the reference to the enclosing C object. Note that this$0 is marked SYNTHETIC because it is logically present in C.java.

In ClassFile C$D, reading C's variable "i" is achieved by calling C.access$000( ) and passing C$D's this$0 field which references an enclosing C object. Assigning C's variable i is achieved by calling C.access$002( ) and again passing this$0. C.access$000 and C.access$002 methods are marked SYNTHETIC.

TABLE 5

JAVA OBJECT CODE "ClassFile C$1"

```
~$ javap -verbose 'C$1'
Classfile C$1.class
    Last modified Jan 14, 2010; size 154 bytes
    MD5 checksum 22ef6152e0ea006b5af2a7eae495c88a
    Compiled from "C.Java"
class C$1 extends java.lang.Object
    SourceFile: "C.Java"
    EnclosingMethod: #6.#0              // C
    InnerClasses:
        static #1 of #6; //class C$1 of class C
    minor version: 0
    major version: 51
    flags: ACC_SUPER, ACC_SYNTHETIC
    Constant pool:
        #1 = Class       #7              // C$1
        #2 = Class       #10             // java/lang/Object
        #3 = Utf8        SourceFile
        #4 = Utf8        C.Java
        #5 = Utf8        EnclosingMethod
        #6 = Class       #11             // C
        #7 = Utf8        C$1
        #8 = Utf8         #9 = Utf8              InnerClasses
        #10 = Utf8       java/lang/Object
        #11 = Utf8       C
    {
    }
```

ClassFile C$1 is the synthetic "secret" class used to ensure private communication between ClassFile C and ClassFile C$D. C$1 is flagged as SYNTHETIC because it is an implementation detail of the compiler and is not logically present in the source code C.java.

Computing Environment

FIG. 1 illustrates a computing environment 100 in accordance with an embodiment of the present invention. Computing environment 100 includes a number of computer systems, which can generally include any type of computer system based on a microprocessor, a mainframe computer, a digital signal processor, a portable computing device, a personal organizer, a device controller, or a computational engine within an appliance. More specifically, referring to FIG. 1, computing environment 100 includes clients 110-112, users 120 and 121, servers 130-150, network 160, database 170, devices 180, and appliance 190.

Clients 110-112 can include any node on a network including computational capability and including a mechanism for communicating across the network. Additionally, clients 110-112 may comprise a tier in an n-tier application architecture, wherein clients 110-112 perform as servers (servicing requests from lower tiers or users), and wherein clients 110-112 perform as clients (forwarding the requests to a higher tier).

Similarly, servers 130-150 can generally include any node on a network including a mechanism for servicing requests from a client for computational and/or data storage resources. Servers 130-150 can participate in an advanced computing cluster, or can act as stand-alone servers. In one embodiment of the present invention, server 140 is an online "hot spare" of server 150.

Users 120 and 121 can include: an individual; a group of individuals; an organization; a group of organizations; a computing system; a group of computing systems; or any other entity that can interact with computing environment 100.

Network 160 can include any type of wired or wireless communication channel capable of coupling together computing nodes. This includes, but is not limited to, a local area network, a wide area network, or a combination of networks. In one embodiment of the present invention, network 160 includes the Internet. In some embodiments of the present invention, network 160 includes phone and cellular phone networks.

Database 170 can include any type of system for storing data in non-volatile storage. This includes, but is not limited to, systems based upon magnetic, optical, or magneto-optical storage devices, as well as storage devices based on flash memory and/or battery-backed up memory. Note that database 170 can be coupled: to a server (such as server 150), to a client, or directly to a network.

Devices 180 can include any type of electronic device that can be coupled to a client, such as client 112. This includes, but is not limited to, cell phones, personal digital assistants (PDAs), smart-phones, personal music players (such as MP3 players), gaming systems, digital cameras, video cameras, portable storage media, or any other device that can be coupled to the client. Note that, in some embodiments of the present invention, devices 180 can be coupled directly to network 160 and can function in the same manner as clients 110-112.

Appliance 190 can include any type of appliance that can be coupled to network 160. This includes, but is not limited to, routers, switches, load balancers, network accelerators, and specialty processors. Appliance 190 may act as a gateway, a proxy, or a translator between server 140 and network 160.

Note that different embodiments of the present invention may use different system configurations, and are not limited to the system configuration illustrated in computing environment 100. In general, any device that is capable of executing computer instructions may incorporate elements of the present invention.

Furthermore, note that some embodiments of the present invention include an apparatus, such as system 200, for performing these flagging techniques automatically, without the assistance of a human. In some embodiments, the object code is not human-readable code, and the flagging technique requires the use of the apparatus.

System

Figure 2:
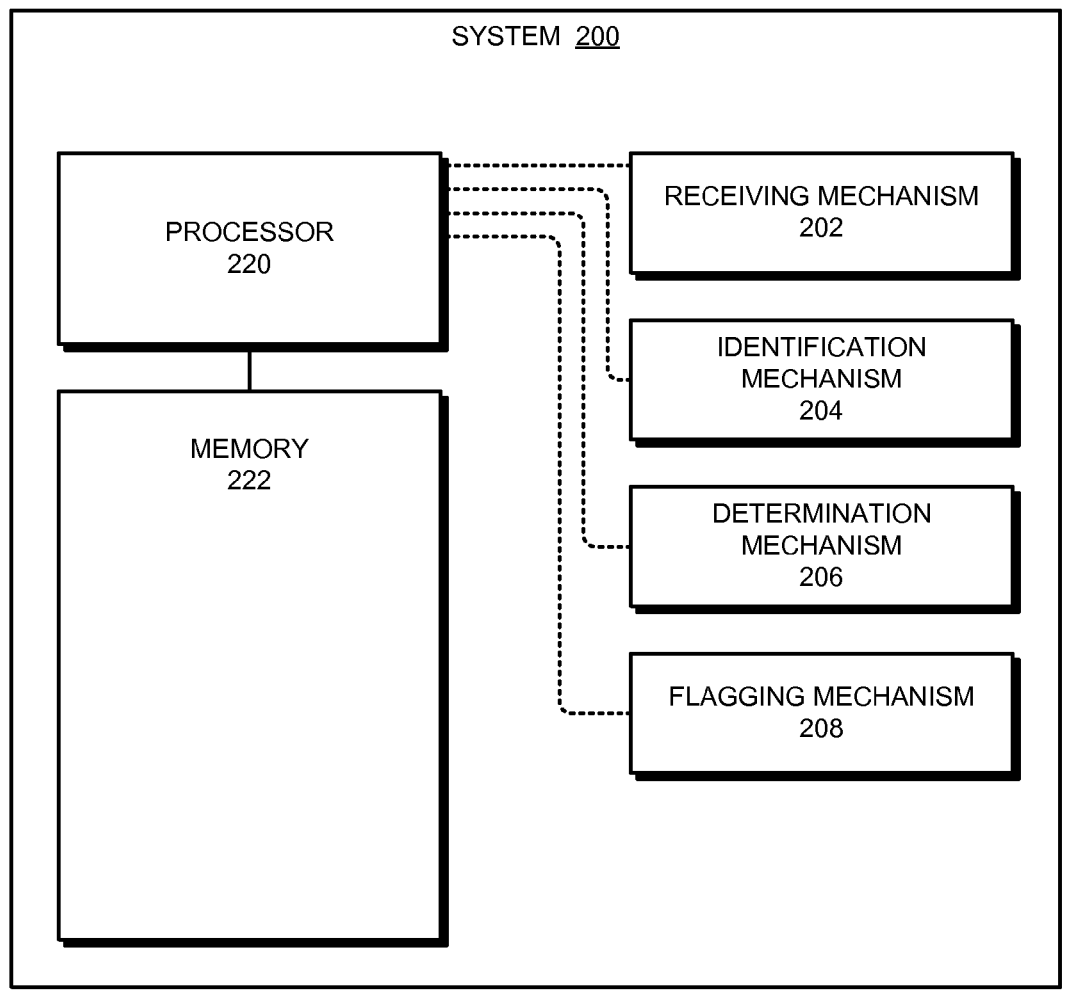
FIG. 2 illustrates a system in accordance with an embodiment of the present invention.

FIG. 2 illustrates a system 200 in accordance with an embodiment of the present invention. As illustrated in FIG. 2, system 200 can comprise server 150, database 170, appliance 190, client 110, devices 180, or any combination thereof. System 200 can also include receiving mechanism 202, identification mechanism 204, determination mechanism 206, flagging mechanism 208, processor 220, and memory 222.

Flagging Constructs

Figure 3:
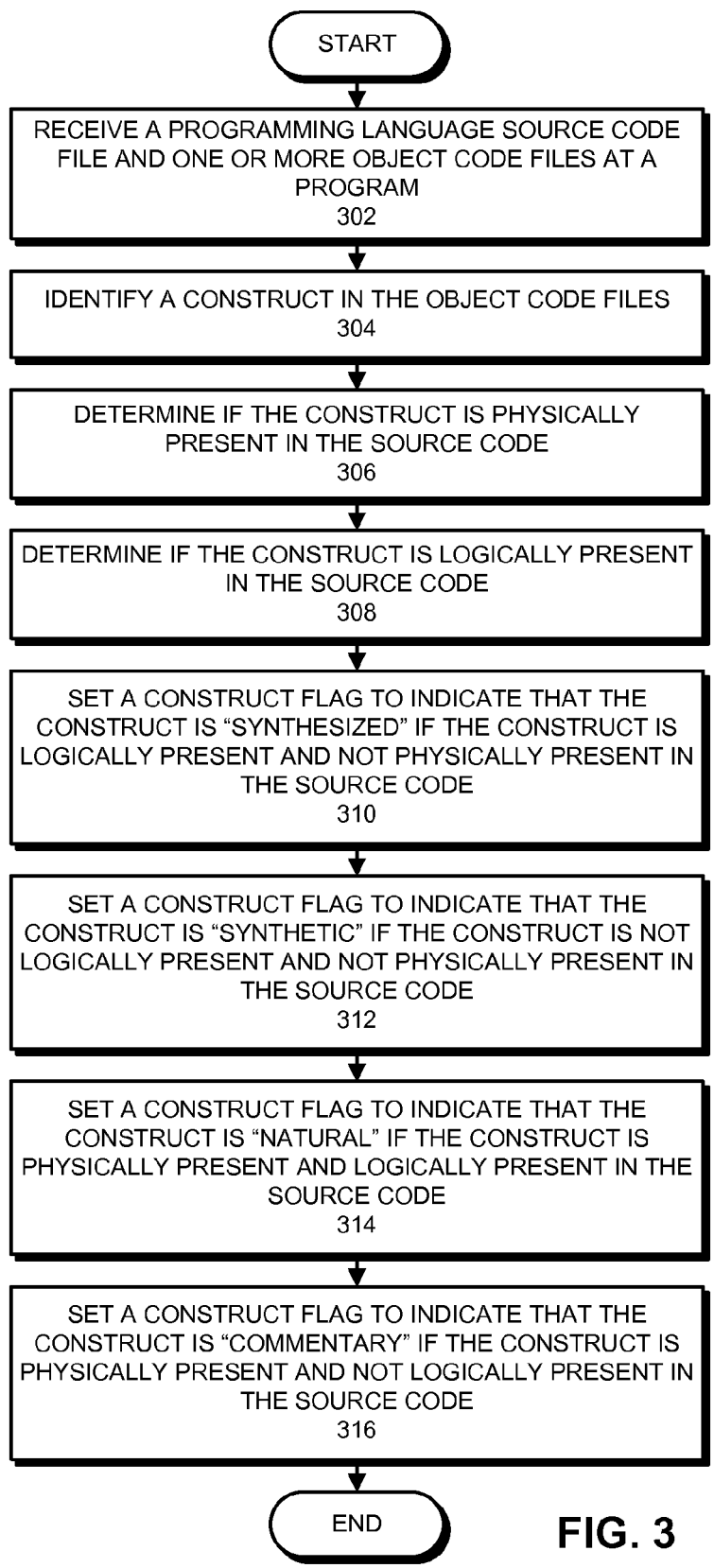
FIG. 3 presents a flow chart illustrating the process of flagging constructs in accordance with an embodiment of the present invention.

FIG. 3 presents a flow chart illustrating the process of flagging constructs in accordance with an embodiment of the present invention. During operation, receiving mechanism 202 receives programming language source code and one or more pieces of object code of a program (operation 302). Note that in some embodiments of the present invention the program may be a compiler, and the compiler may create the pieces of object code from the source code.

Next, identification mechanism 204 identifies a construct in the object code (operation 304). As described previously, the construct can include any artifact in the object code that has a relationship to the programming language of the source code. This can include sub-artifacts, such as method parameters. Determination mechanism 206 then determines whether the construct is physically present in the source code (operation 306). Determination mechanism 206 also determines whether the construct is logically present in the source code if the construct is not physically present (operation 308).

Once the determinations have been made, flagging mechanism 208 sets a construct flag to indicate that the construct is "synthesized" if the construct is logically present in the source code and not physically present in the source code (operation 310). Additionally, flagging mechanism 208 sets the construct flag to indicate that the construct is "synthetic" if the construct is not logically present in the source code and not physically present in the source code (operation 312). Next, if the construct is physically present in both the source code and the object code and is logically present in the source code, flagging mechanism 208 sets the construct flag to indicate that the construct is "natural" (operation 314). Finally, if the construct is physically present in both the source code and the object code and is not logically present in the source code, flagging mechanism 208 sets the construct flag to indicate that the construct is "commentary" (operation 316).

Note that the construct flags can be implemented in numerous ways depending on the programming language in question. Also note that the various construct states are mutually exclusive by nature.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for characterizing artificiality in object code, the method comprising:
   receiving source code of a program;
   receiving one or more pieces of object code of the program;
   identifying a construct in the object code;
   determining if the construct is physically present in the source code;
   determining if the construct is logically present in the source code, wherein a construct is logically present if the constuct is required by the programming language;
   setting a construct flag to indicate that the construct is "synthesized" if the construct is not physically present but logically present in the source code;
   setting the construct flag to indicate that the construct is "synthetic" if the construct is not physically present and not logically present in the source code;
   setting the construct flag to indicate that the construct is "natural" if the construct is physically present and logically present in the source code;
   setting the construct flag to indicate that the construct is "commentary" if the construct is physically present but not logically present in the source code; and
   making the construct flag available to a reflective application programming interface.

2. The computer-implemented method of claim 1, wherein the construct can include any artifact in the object code that has a relationship to the language of the program of the source code.

3. The computer-implemented method of claim 1, wherein the construct can include at least one of:
   a piece of object code;
   a method, including constructors and static initializers; a method parameter; a field; a local variable; and an annotation.

4. The computer-implemented method of claim 1, further comprising:
   identifying a method in the object code;
   identifying a parameter of the method;
   determining if the parameter is physically present in the source code;
   if the parameter is not physically present, determining if the parameter is logically present in the source code;
   if so, setting a parameter flag to indicate that the parameter is "synthesized;" and
   if not, setting the parameter flag to indicate that the parameter is "synthetic."

5. The computer-implemented method of claim 4, further comprising:
   identifying a further parameter of the method, wherein the further parameter is logically present at runtime, but is not physically present in the source code and is not physically present in the object code; and
setting a second parameter flag to indicate that the further parameter is "implicit".

6. The computer-implemented method of claim 1, wherein constructs flagged as "synthesized" are revealed by the reflective application programming interface.

7. The computer-implemented method of claim 1, wherein the construct flag is saved in the object code.

8. The computer-implemented method of claim 1, wherein the program is a compiler, and wherein the program receives one or more pieces of object code by creating the one or more pieces of object code from the source code.

9. The method of claim 1, wherein using the source code to determine if the construct is physically present in the source code comprises searching the source code for the construct,
   wherein determining if the construct is logically present in the source code comprises searching the source code to determine if the construct is logically present in the source code; and
   wherein the object code is different from the source code.

10. A non-transitory computer-readable storage medium storing instructions that when executed by a computer cause the computer to perform a method for characterizing artificiality in object code, the method comprising:
- receiving the source code of a program;
- receiving one or more pieces of object code of the program;
- identifying a construct in the object code;
- determining if the construct is physically present in the source code;
- determining if the construct is logically present in the source code, wherein a construct is logically present if the construct is required by the language of the program;
- setting a construct flag to indicate that the construct is "synthesized" if the construct is not physically present but logically present in the source code;
- setting the construct flag to indicate that the construct is "synthetic" if the construct is not physically present and not logically present in the source code;
- setting the construct flag to indicate that the construct is "natural" if the construct is physically present and logically present in the source code;
- setting the construct flag to indicate that the construct is "commentary" if the construct is physically present but not logically present in the source code; and
- making the construct flag available to a reflective application programming interface.

11. The computer-readable storage medium of claim 10, wherein the construct can include any artifact in the object code that has a relationship to the programming language of the source code.

12. The computer-readable storage medium of claim 10, wherein the construct can include at least one of:
- a piece of object code;
- a method, including constructors and static initializers;
- a method parameter;
- a field;
- a local variable; and
- an annotation.

13. The computer-readable storage medium of claim 10, wherein the method further comprises:
- identifying a method in the object code;
- identifying a parameter of the method;
  - determining if the parameter is physically present in the source code;
  - if the parameter is not physically present, determining if the parameter is logically present in the source code;
  - if so, setting a parameter flag to indicate that the parameter is "synthesized"; and
  - if not, setting the parameter flag to indicate that the parameter is "synthetic".

14. The computer-readable storage medium of claim 13, wherein the method further comprises:
- identifying a further parameter of the method, wherein the further parameter is logically present at runtime, but is not physically present in the source code and is not physically present in the object code; and setting a second parameter flag to indicate that the further parameter is "implicit".

15. The computer-readable storage medium of claim 10, wherein constructs flagged as "synthesized" are revealed by the reflective API.

16. The computer-readable storage medium of claim 10, wherein the construct flag is saved in the object code.

17. An apparatus configured for characterizing artificiality in object code, comprising:
- a processor;
- a memory;
- a receiving mechanism configured to receive the source code of a program;
- wherein the receiving mechanism is further configured to receive one or more pieces of object code of the program;
- an identification mechanism configured to identify a construct in the object code;
- a determination mechanism configured to determine whether the construct is physically present in the source code;
- wherein the determination mechanism is further configured to determine whether the construct is logically present in the source code, wherein a construct is logically present if the construct is required by the programming language;
- a flagging mechanism configured to set a construct flag to indicate that the construct is "synthesized" if the construct is logically present in the source code and not physically present in the source code;
- wherein the flagging mechanism is further configured to set the construct flag to indicate that the construct is "synthetic" if the construct is not logically present in the source code and not physically present in the source code;
- wherein the flagging mechanism is further configured to set the construct flag to indicate that the construct is "natural" if the construct is physically present and logically present in the source code;
- wherein the flagging mechanism is further configured to set the construct flag to indicate that the construct is "commentary" if the construct is physically present but not logically present in the source code; and
- wherein the flagging mechanism is configured to make the construct flag available to a reflective application programming interface.

18. The apparatus of claim 17:
- wherein the identification mechanism is further configured to identify a method in the object code;
- wherein the identification mechanism is further configured to identify a parameter of the method;
- wherein the determination mechanism is further configured to determine whether the parameter is physically present in the source code;
- wherein the determination mechanism is further configured to determine whether the parameter is logically present in the source code if the parameter is not physically present;
- wherein the flagging mechanism is further configured to set a parameter flag to indicate that the parameter is "synthesized" if the parameter is logically present in the source code and not physically present in the source code; and
- wherein the flagging mechanism is further configured to set a parameter flag to indicate that the parameter is "synthetic" if the parameter is not logically present in the source code and not physically present in the source code.

* * * * *

UNITED STATES PATENT AND TRADEMARK OFFICE
CERTIFICATE OF CORRECTION

| | | |
|---|---|---|
| PATENT NO. | : 8,843,888 B2 | Page 1 of 1 |
| APPLICATION NO. | : 12/694139 | |
| DATED | : September 23, 2014 | |
| INVENTOR(S) | : Darcy et al. | |

It is certified that error appears in the above-identified patent and that said Letters Patent is hereby corrected as shown below:

On title page, column 2, under Other Publications, line 2, delete "[Rrtrieved" and insert -- [Retrieved --, therefor.

On title page, column 2, under Other Publications, line 7, delete "Interent" and insert -- Internet --, therefor.

On title page 2, column 2, under Other Publications, line 6, delete "[Retrived" and insert -- [Retrieved --, therefor.

In the claims

In column 16, line 6, in Claim 1, delete "constuct" and insert -- construct --, therefor.

In column 18, line 13, in Claim 17, before "determine" insert -- use the source code to --.

Signed and Sealed this
Twenty-eighth Day of April, 2015

Michelle K. Lee
*Director of the United States Patent and Trademark Office*